(12) United States Patent
Litman et al.

(10) Patent No.: US 12,511,029 B2
(45) Date of Patent: Dec. 30, 2025

(54) USER INTERFACE FOR AN AUTOMATED MASSAGE SYSTEM WITH BODY MODEL AND CONTROL OBJECT

(71) Applicant: Aescape, Inc., New York, NY (US)

(72) Inventors: Eric A. Litman, Brooklyn, NY (US); Sean Furr, Emeryville, CA (US); Nicholas Akiona, New York, NY (US); Mikhail Nakhimovich, Randolph, NJ (US)

(73) Assignee: Aescape, Inc., New York, NY (US)

( * ) Notice: Subject to any disclaimer, the term of this patent is extended or adjusted under 35 U.S.C. 154(b) by 19 days.

(21) Appl. No.: 18/374,371

(22) Filed: Sep. 28, 2023

(65) Prior Publication Data

US 2025/0110628 A1  Apr. 3, 2025

(51) Int. Cl.
*G06F 3/04847* (2022.01)
*B25J 13/06* (2006.01)

(52) U.S. Cl.
CPC .......... *G06F 3/04847* (2013.01); *B25J 13/06* (2013.01)

(58) Field of Classification Search
CPC .............................. G06F 3/04847; B25J 13/06
See application file for complete search history.

(56) References Cited

U.S. PATENT DOCUMENTS

| | | | | |
|---|---|---|---|---|
| 2001/0014781 A1* | 8/2001 | Nissim | ................... | A61H 7/001 601/84 |
| 2009/0288017 A1* | 11/2009 | Just | ....................... | A61G 13/10 715/750 |
| 2015/0305967 A1* | 10/2015 | O'Neal | .............. | A61H 15/0078 601/117 |
| 2015/0335518 A1* | 11/2015 | Boyer | .................. | A61H 9/0057 601/9 |
| 2017/0079871 A1* | 3/2017 | Zhang | .................... | G16H 40/63 |
| 2017/0266077 A1* | 9/2017 | Mackin | .............. | A61G 13/1235 |
| 2018/0113312 A1* | 4/2018 | Jung | ........................ | A61H 7/00 |
| 2020/0126297 A1* | 4/2020 | Tian | ...................... | G06T 7/0012 |
| 2020/0281805 A1 | 9/2020 | Qiu | | |

(Continued)

FOREIGN PATENT DOCUMENTS

| | | |
|---|---|---|
| CN | 115870952 | 3/2023 |
| CN | 115972202 | 4/2023 |
| WO | 2021116554 | 6/2021 |

OTHER PUBLICATIONS

Rideout, Philip; Getting Started with Filament on Android; Apr. 3, 2020; Medium; https://medium.com/@philiprideout/getting-started-with-filament-on-android-d10b16f0ec67; pp. 1-15. (Year: 2020).*

(Continued)

*Primary Examiner* — John T Repsher, III
(74) *Attorney, Agent, or Firm* — Van Pelt, Yi & James LLP

(57) ABSTRACT

A body model representing a massage recipient of an automated massage that is provided via a robotic arm is received. A user input is received via a control object in a user interface. The user input is output where the user input is used to update the automated massage that is provided via the robotic arm. The body model, the control object associated with controlling the automated massage that is provided via the robotic arm, and massage information associated with the automated massage that is provided via the robotic arm are displayed via the user interface.

21 Claims, 11 Drawing Sheets

(56) References Cited

U.S. PATENT DOCUMENTS

| | | | | |
|---|---|---|---|---|
| 2020/0397644 A1* | 12/2020 | Jung | ............... | A61H 1/00 |
| 2021/0154852 A1 | 5/2021 | Eyssautier | | |
| 2022/0134551 A1* | 5/2022 | Litman | ............... | G16H 50/20 |
| | | | | 700/260 |
| 2023/0172536 A1* | 6/2023 | Hashkes | ............... | G16H 50/50 |
| | | | | 600/595 |
| 2023/0414430 A1* | 12/2023 | Godlasky | ............... | A61G 13/08 |

OTHER PUBLICATIONS

Author Unknown, Real Relax@ PS6000 Massage Chair Brown, RealRelax, Aug. 24, 2023, https://realrelaxmassage.com/collections/platinum-series/products/real-relax%C2%AE-ps6000-massage-chair-brown.

* cited by examiner

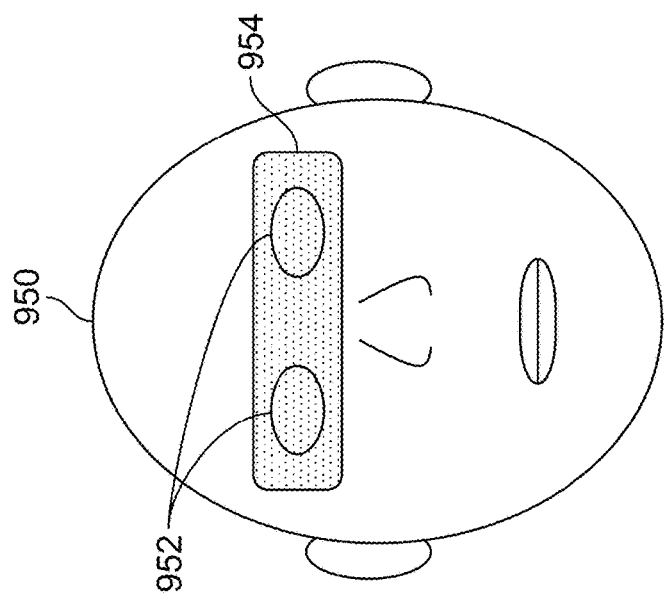
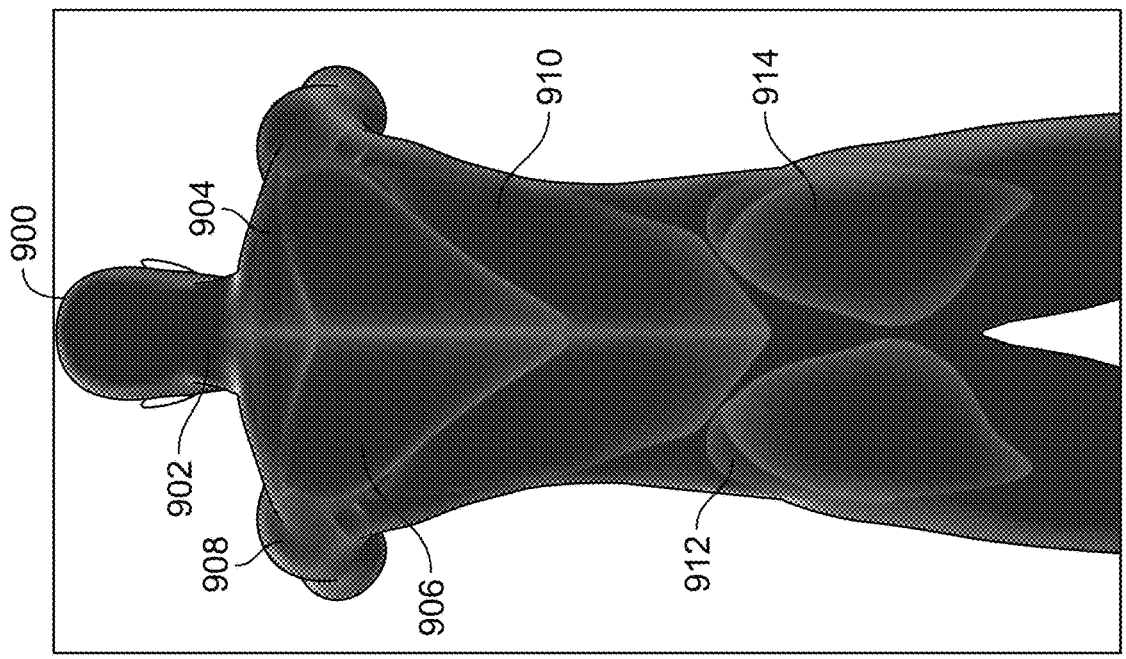

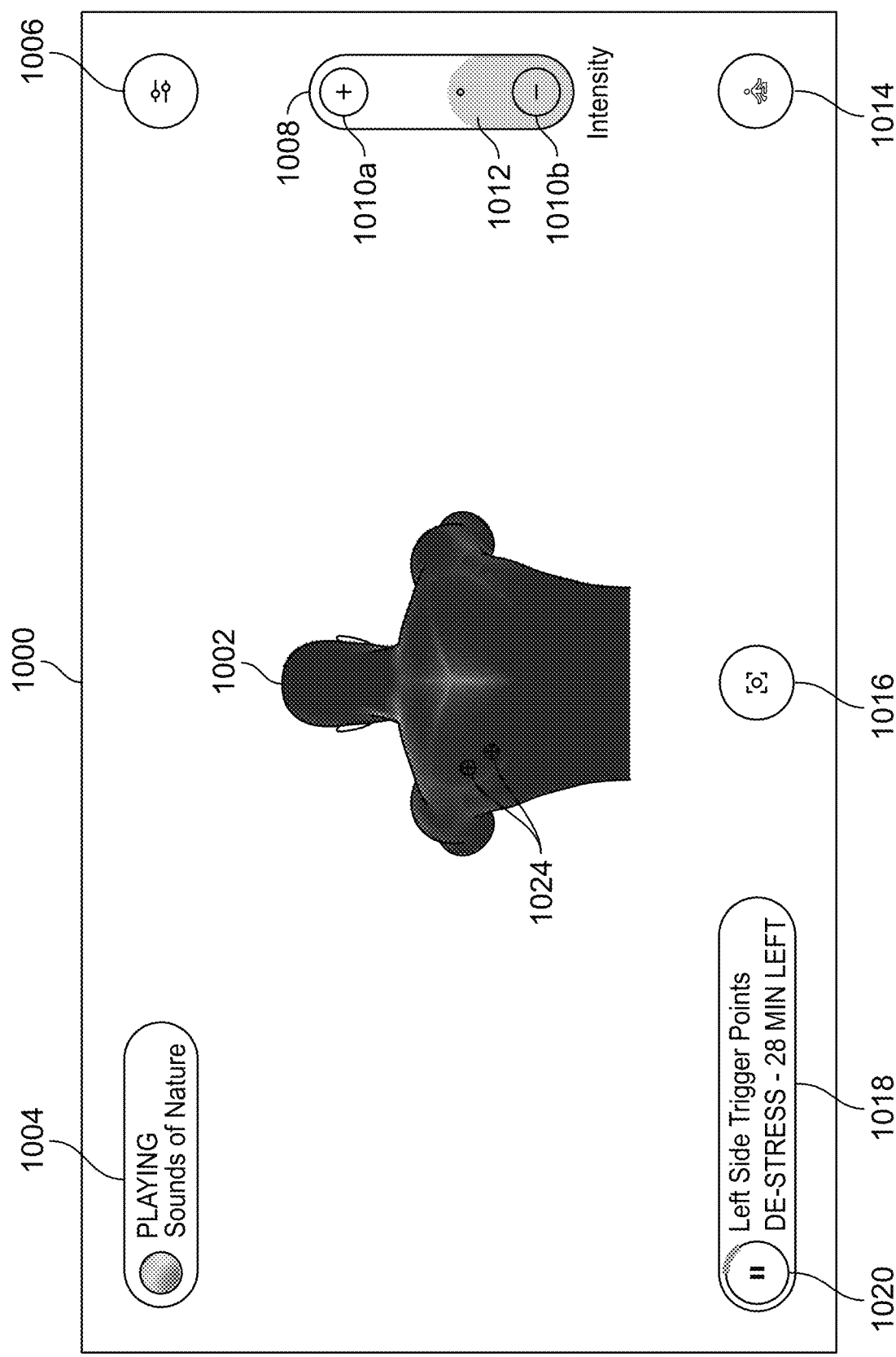

USER INTERFACE FOR AN AUTOMATED MASSAGE SYSTEM WITH BODY MODEL AND CONTROL OBJECT

BACKGROUND OF THE INVENTION

The benefits of massage therapy have been known for many years. However, recent progress in the field has been stagnant and the field is ripe for new massage therapy techniques. New systems and/or techniques associated with performing massage therapy would be desirable.

BRIEF DESCRIPTION OF THE DRAWINGS

Various embodiments of the invention are disclosed in the following detailed description and the accompanying drawings.

FIG. 9A is a diagram illustrating an embodiment of a 3D body model with interior details showing muscles.

FIG. 9B is a diagram illustrating an embodiment of a body model with a universally-restricted region.

FIG. 10 is a diagram illustrating an embodiment of a display with a 3D body model with muscles.

DETAILED DESCRIPTION

Figure 1:
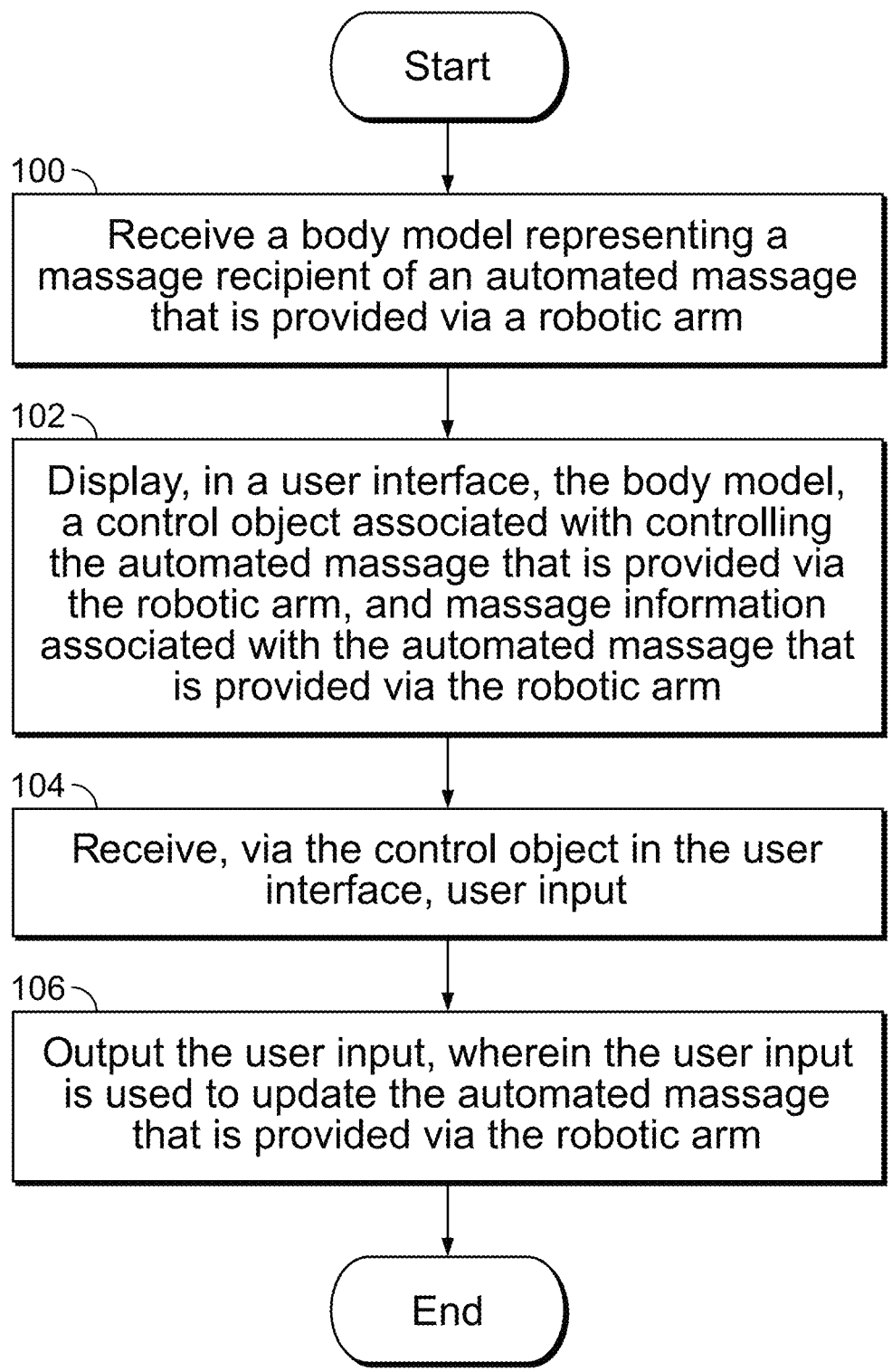
FIG. 1 is a flowchart illustrating an embodiment of a process to present a body model and control object associated with an automated massage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique and/or system associated with displaying a body model (e.g., that represents a massage recipient (sometimes referred to herein as a user) of an automated massage) and control object (e.g., an object displayed by a user interface that can be interacted with by the massage recipient to control and/or manage some aspect of the automated massage) are described herein. For example, a display and/or user interface associated with an automated massage (e.g., table) system may act as both a communication tool to communicate (e.g., historic, current, and/or future) actions of the robotic arm(s) of the automated massage system, as well as an interactive interface to enable adjustments to the robotic arm(s) (e.g., currently and/or in the future). In some embodiments, in addition to displaying a body model and a control object, a user interface also displays upcoming, projected, and/or future information associated with the automated massage, such as a projected path that a robotic arm will follow (e.g., relative to and/or superimposed upon the body model).

In various embodiments, the information that is presented, visualized, and/or displayed in a user interface (e.g., including but not limited to the body model and the massage information) may communicate the following information: a user's body to show approximate location and position on an automated massage table; (e.g., approximate) location of an automated massage table's robotic arm(s) in relation to a user's body in real-time (e.g., including a future, projected path and/or a historic path); visually indicate (e.g., using color or line thickness) a pressure intensity of a robotic arm in real time; display muscle regions and/or specific muscles, as well as other information about the body in abstract or detailed view; display user-specified targeted areas for treatment or avoidance; indicate when a significant change in body position is detected that forces a massage to pause and/or recalibrate, etc.

In various embodiments, a user interface associated with an automated massage system may support or otherwise expose a variety of user interactions. For example, a user can tap on an indicator of a robotic arm position (as or if desired) to: adjust the location or position of a robotic arm; select a "repeat" option to allow for continuous work where a robotic arm is currently located or touching (e.g., not previously programmed in a current massage session); and/or move a robotic arm away from and/or avoid a current position (e.g., not previously programmed in a current massage session). Or, a user can tap on a location and/or part of a body model to: tell a robotic arm to avoid a selected area of a user's body; tell a robotic arm to spend more time on selected area of a user's body; and/or specify a pressure limit or other setting for a selected area of a user's body.

The following figure describes one example process that is performed by a user interface controller and user interface that are part of an automated massage system (e.g., a table system with one or more attached or associated robotic arms). As will be described in more detail below, an automated massage system may include a controller that is responsible for managing a user interface (i.e., the user interface controller), as well as other controllers and/or processors that are responsible for performing other tasks and/or managing (other) peripheral components.

FIG. 1 is a flowchart illustrating an embodiment of a process to present a body model and control object associated with an automated massage system. In some embodiments, the process of FIG. 1 is performed by a user interface, such as a touchscreen, and a user interface controller where the user interface controller communicates with and controls the user interface.

At 100, a body model representing a massage recipient of an automated massage that is provided via a robotic arm is received. In one example, sensors may be used to measure or otherwise estimate a user's height and weight and a corresponding body model is selected from a collection of pre-constructed body models of various heights and weights. In some embodiments, the pre-constructed body models have variations in other dimensions and/or body features (e.g., neck length (e.g., longitudinally), neck width (e.g., laterally), neck height (e.g., vertically, from the plane of the massage table), arm length, arm width, and so on). Alternatively, in some other embodiments, step 100 includes receiving a customized and/or user-specific body model (e.g., where the size and/or shape of the body model depends upon sensor information taken from and/or associated with a massage recipient).

In some embodiments, a body model (e.g., received at step 100) has one or more of the following properties, features, and/or characteristics:
  two-dimensional (2D) or three-dimensional (3D);
  outline-only or contains one or more interior details (e.g., the body model shows bones, muscles, tendons, organs, etc.);
  contains one or more exterior details and/or is based at least in part on an image (e.g., the body model includes or otherwise shows the clothes that a user is currently wearing);
  created based on contact sensing via an automated massage system that includes a robotic arm (e.g., either through some other component of the automated massage system (such as sensors in the mattress or platform of the automated massage system) or through the robotic arm(s) touching, tracing, and/or otherwise collecting spatial coordinates to construct the body model);
  static or dynamic (e.g., updated continuously in real time, periodically, etc.);
  includes a timestamp or other accuracy-related metadata (e.g., the time and date when the body model was generated or other information which may be used to determine whether a given body model is still accurate and/or select a body model if multiple body models are stored or otherwise available).
  is selected from a group of pre-constructed body models or is customized based on sensor information (e.g., a user-specific body model); and/or
  corresponds to an entire body or a subset of the entire body (e.g., internal and/or external). In some embodiments, the body model that is displayed or otherwise presented may not correspond to the entirety of the body model that is generated. For example, a system may generate a body model of a user's shoulders through glutes (e.g., including muscles and skeletal features) and excluding the feet and the head), and what is presented or otherwise displayed is a subset of that (e.g., present a visualization of the muscles and bony features in the mid and lower back without showing the entirety or rest of the body model.

It is noted that the diagrams, properties, features, and/or characteristics described herein (e.g., of a body model, a control object, upcoming automated massage information, etc.) are merely exemplary and are not intended to be limiting and/or exhaustive.

In some embodiments, step 100 is performed by a user interface controller that receives a (e.g., user-specific) body model from a (e.g., black-box) body model generator that is responsible for generating the body model. As will be described in more detail below, a body model generator may be connected to one or more sensors (e.g., depth-sensing and/or infrared cameras) that generate sensor information based on the massage recipient, where the sensor information is used by the body model generator to generate a (e.g., user-specific) body model.

At 102, the body model, a control object associated with controlling the automated massage that is provided via the robotic arm, and massage information associated with the automated massage that is provided via the robotic arm are displayed in a user interface.

In one example, step 102 is performed by a user interface (such as a touchscreen, haptic interface, 3D mouse, etc.). In some embodiments, the body model is a dynamic body model where new body models are continuously or periodically received (e.g., at 100) and displayed (e.g., at 102). For example, if the massage recipient shifts their position, then the updated body model(s) will reflect the shifted position of the massage recipient.

In some embodiments, a control object (e.g., displayed at 102) has one or more of the following types of control objects and/or controls one or more of the following aspects of an automated massage:
  includes one or more of the following: a button (e.g., a radio button), a checkbox, a slider, a dial, touch-gesture control object (e.g., for swiping, multi-finger taps, press and hold, etc.), a draggable element (e.g., control points on a spline), a selectable region, or a text field (e.g., input a value and/or alphanumeric character(s));
  is associated with changing a time duration (e.g., extending a press and hold (i.e., compression) stroke to be longer), is associated with changing a touchpoint indicator, and/or is associated with providing feedback for the massage content (e.g., pressing an "I like this button" or similar; pressing an "I don't like this button" or similar); increasing or decreasing an amount of pressure and/or intensity applied by a robotic arm; etc.);
  is associated with managing (e.g., including creating, deleting, and modifying) a user-specified area preference (e.g., an area to focus on or avoid, continue performing the same massage strokes and/or type of work in a region);
  is associated with setting a limit on the automated massage (e.g., a time limit or pressure limit, in general or for a selected body part or region);
  is associated with changing a trajectory (e.g., where a trajectory describes where and how a robotic arm will contact or otherwise touch a massage recipient and a trajectory may include position, orientation, intended point of contact, and force information);

is associated with adjusting massage content (e.g., addition or removal of massage elements); and/or.

is associated with a user interacting with the body model (e.g., by drawing and/or illustrating on the displayed or presented body model) to specify desired massage work (and in response, the automated massage system creates or selects appropriate massage content).

The above list is merely exemplary and is not intended to be limiting. Some examples of control objects are described in more detail below.

In some embodiments, the massage information (e.g., displayed at 102) includes or communicates one or more of the following types of information:

a tempo or a speed of the automated massage;

a massage action type or a stroke type (e.g., that is currently being performed, such as circular friction, warm-up/effleurage, palpation, etc.);

a massage application (e.g., application of lubrication, application of heat, etc.);

a stroke or content library (e.g., to allow for selecting additional (e.g., massage) content based on a selected region, mid-massage);

a stroke history (e.g., a line showing a past or historic path, possibly displayed on the body model, where a robotic arm touched and/or massaged the massage recipient);

a touchpoint position or touchpoint orientation (e.g., a current touchpoint position is where a robotic arm is currently touching the user; a future touchpoint position may be used by the user to specify or otherwise control where the user would like a robotic arm to touch the user (e.g., in a future massage session); etc.);

a trajectory (e.g., a line showing a future or projected path, possibly displayed on the body model, where a robotic arm will touch and/or massage the massage recipient);

a trajectory property (e.g., whether a given trajectory is original or adjusted, editable or non-editable, etc.);

an intensity indication (e.g., based on and/or relating to an amount of pressure; indicated using a number, a color within a color gradient, a line thickness; etc.);

a massage interruption notification in response to satisfaction of a movement detection criterion (e.g., a user makes a large movement and/or a movement consistent with trying to get off a massage table, the automated massage system pauses the automated massage, and the user is notified about the pause and/or interruption to the automated massage); and/or a universally-restricted region (e.g., a region or part of the body that, for all users for a given set of massage content being performed, a robotic arm will not touch).

The above list is merely exemplary and is not intended to be limiting. More detailed massage information examples are described below.

Although some examples described herein describe a touchscreen and/or display, a user interface may include or comprise a haptic interface, 3D mouse, or other features and/or components. In one example, the user interface includes a microphone and the user input is received (e.g., at 104) via the microphone (e.g., to give the massage recipient voice control over the automated massage). For simplicity and ease of explanation, assume that (at least in this example) any voice-directed user input and/or touch-directed user input is consolidated into a common control object (e.g., at 104) so that downstream handling or passing of the user input (e.g., to an automated massage controller) is uniform and/or simplified.

At 104, user input is received via the control object in the user interface.

At 106, the user input is output, wherein the user input is used to update the automated massage that is provided via the robotic arm.

In some embodiments, steps 104 and 106 are performed by a user interface controller where there is a (e.g., separate) automated massage controller which is responsible for generating the automated massage and updating it in response to user input. Step 106 may comprise the user interface controller outputting the user input to an automated massage controller to generate an updated automated massage. The updated automated massage may (as an example) include a change to some current and/or future aspect of the automated massage, such as a massage path (followed by a robotic arm), a repeated sequence, an amount of pressure, and so on.

One benefit to the techniques and/or systems described herein is that they permit a massage recipient (i.e., a user) to customize and/or control an automated massage (e.g., provided by an automated massage table) so that the provided therapy is not harmful, undesirable, and/or uncomfortable. For example, a massage recipient may have a sensitive or off-limits part of their body due to an internal or external injury, a cut or other dermatological issue, surgery, or even just being ticklish or having heightened sensitivity. With the techniques and/or systems described herein, a massage recipient can prevent an automated massage (e.g., table) system from coming into contact with such off-limits body parts. Even if a massage recipient does not necessarily think (e.g., before an automated massage begins) they have a sensitive or off-limits part of their body, during the automated massage, they may wish to adjust the automated massage for certain, specific parts of their body (e.g., reducing an amount of pressure for a specific part of the body, skipping or "fast forwarding" through a current and uncomfortable section of the automated massage, etc.). By presenting one or more control objects in combination with a body model, the massage recipient has a greater degree of specificity and accuracy in their ability to control the automated massage (e.g., with respect to specific body parts) compared to other systems that merely provide control objects but no body model (e.g., for context and/or reference). The presentation of both a body model and one or more control objects provides important (e.g., visual and/or spatial) context, feedback, specificity, accuracy, and/or control.

Another benefit to the techniques described herein is that specific and real-time spatial information about where the robotic arms are currently or will (e.g., in the future) come into contact with a massage recipient can be presented (at least in some embodiments). For example, even if a user moves their arms further away from their torso, or shifts the position of their legs, the displays and/or user interfaces described herein can display dynamic and/or updated body models that reflect the current arrangement and/or positioning of the massage recipient's limbs and other body parts. Furthermore, any (e.g., spatial) adjustments made to the automated massage in response to movement or shifting by the massage recipient is also updated and reflected in the display and/or user interface (at least in some embodiments) so that the massage recipient knows that the automated massage system is aware of the massage recipient's shifting and has adapted accordingly. In some application scenarios, there is no attendant present (e.g., the massage recipient is alone in the room) and letting the massage recipient know about the responsiveness of the automated massage system may reassure the user and/or ease their anxiety about using new robotic technology.

In particular, automated massage systems with robotic arms (e.g., as opposed to automated massage chairs or other automated massage systems without robotic arms) may require a higher degree of (e.g., proactive) communication and/or a higher degree of control in order to establish trust with the user. For example, because robotic arms can extend and rotate and have the potential to hit a user with a great deal of force, a user may have concerns about the robotic arms going out-of-control and/or harming the user. The (e.g., user interface) systems and/or techniques described herein may alleviate this problem that is specific to automated massage systems with robotic arms.

The techniques and/or systems described herein relate to a variety of user interfaces, controls, and/or displays. For brevity, techniques which are known to persons of ordinary skill in the art are not necessarily and/or exhaustively described herein. For example, some exemplary displays (e.g., presented in a touchscreen) are described herein, but the transition to or from such a display (e.g., the user interaction(s) that cause such a display to be presented or subsequently hidden) is not necessarily described since such transitions are known to one of ordinary skill in the art. Similarly, certain combinations of exemplary control objects are shown in the figures, but other combinations and/or types of control objects are known to a person of ordinary skill in the art and may be used in other embodiments.

It may be helpful to show an embodiment of an automated massage table with a user interface that displays a body model, a control object, and massage information. The following figure shows one such embodiment.

Figure 2:
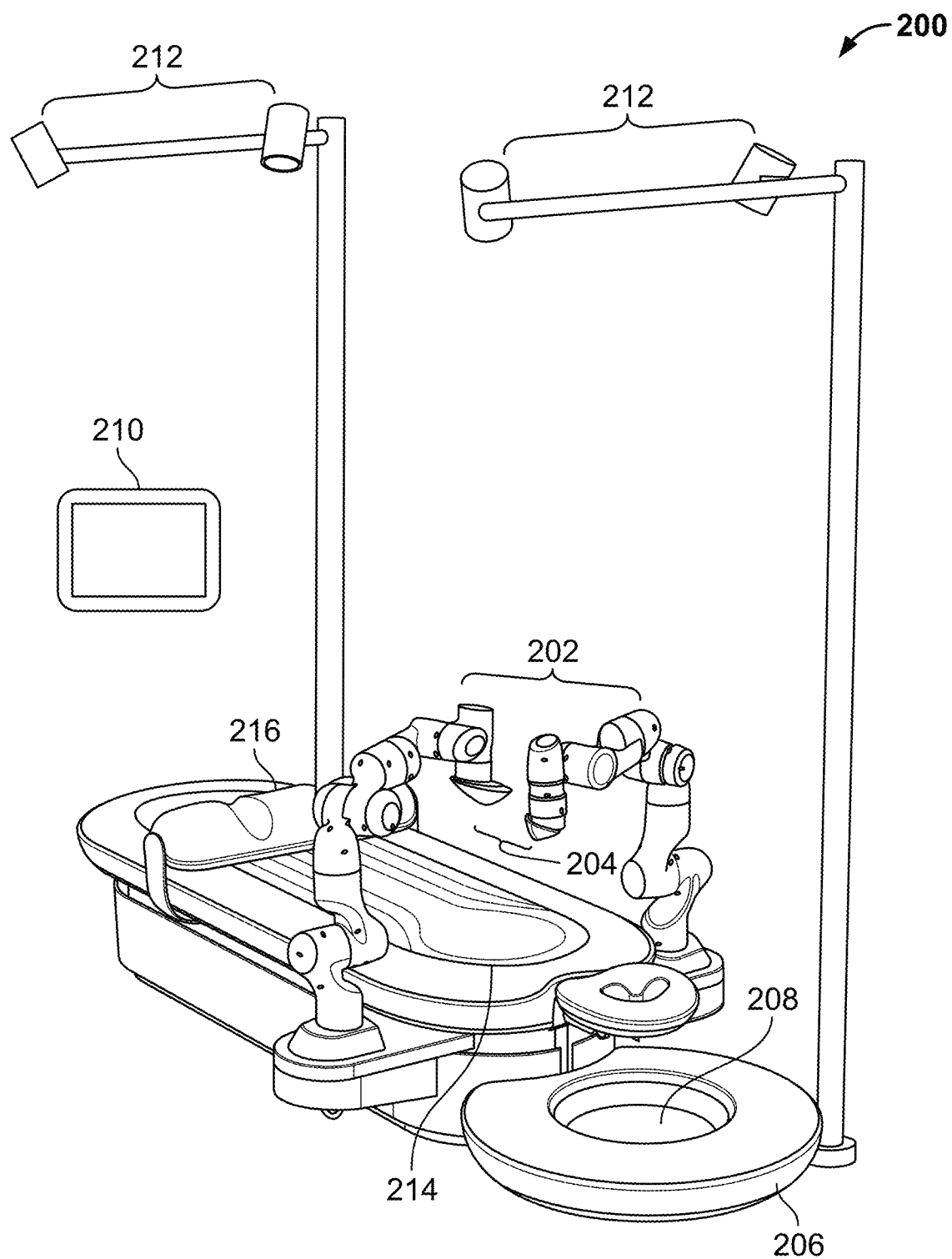
FIG. 2 is a diagram illustrating an embodiment of an automated massage table that includes robotic arms.

FIG. 2 is a diagram illustrating an embodiment of an automated massage table that includes robotic arms. In this example, the automated massage table (200) includes two robotic arms (202) that have multiple degrees of freedom and/or movement in order to provide an automated massage to a massage recipient (e.g., without requiring a massage therapist). In this example, each robotic arm (202) includes an end effector (204) located at the distal end of the robotic arm. The end effector (204) is the part of the robotic arm (202) that comes into contact with a massage recipient; other parts of the robotic arm (202) do not come into contact with the massage recipient. In some embodiments, an end effector (204) is a detachably-coupled part of a robotic arm (202) and (if desired) different end effectors (e.g., having different shapes and/or appendages) can be swapped in or out.

In this example, the automated massage table (200) includes a ring-shaped armrest (206). For example, when a massage recipient is lying in a prone position (i.e., face down) on the automated massage table (200), the massage recipient would rest their hands and forearms on the armrest (206). In the center of the ring-shaped armrest (206) is a touchscreen (208) (or, more generally, a user interface). The touchscreen (208) is one example of a user interface that presents or otherwise displays a body model and a control object. Via the control object and/or touchscreen (208), a massage recipient can control some aspect of the automated massage that is provided via the robotic arms (202), which includes the end effectors (204).

In this example, the automated massage table (200) is associated with and/or in communication with a tablet (210) that includes (another) touchscreen where the tablet (210) is (e.g., physically) separate from the automated massage table (200). In this example, tablet (210) also presents a display that includes a body model and a control object (e.g., in addition to the touchscreen (208)). In the example, a massage recipient can lie down either in a prone (i.e., face down) position with the moveable bolster (216) supporting the ankles, or in a supine (i.e., face up) position with the moveable bolster (216) supporting the knees. When the massage recipient is in a supine position and the touchscreen (208) in the armrest (206) is located behind the massage recipient's head, the massage recipient can more easily see the body model and/or interact with the control object using the tablet (210). It is noted that the tablet (210) and touchscreen (208) are merely examples of a user interface and are not intended to be limiting; any combination and/or types of user interfaces may be used.

The automated massage table (200) also includes four depth-sensing and/or infrared (IR) cameras (212), including lights. In this example, the cameras (212) are used to (e.g., continuously or periodically) generate a user-specific and dynamic body model that is displayed on the tablet (210) and/or the touchscreen (208) in the armrest (206). Examples of body models that may be generated using depth-sensing camera(s) (as well as other body model examples that are generated using other types of sensors) are described in more detail below.

In some embodiments, a body model is generated by combining the four images that are respectively generated by the four depth-sending cameras (212). In one example, the images are combined and/or blended so that the components of the massage table (e.g., the robotic arms (202) including the end effectors (204), the table (214), the bolster (216), the armrest (206), etc.) are "cut out" to produce a (e.g., body-shaped) body model that corresponds to just the user. In some embodiments, subsequent image filtering (e.g., a vanity filter), manipulation, and/or editing is performed on the (e.g., body-shaped) body model (e.g., for aesthetics, for technical performance reasons (e.g., takes less memory to store and/or is easier to manipulate or transform), etc.).

As is shown in this example, in some embodiments, a robotic arm (e.g., 202) is included in an automated massage table system (e.g., 200) and the robotic arm is movably coupled to the automated massage table system beneath a table (e.g., 214) in the automated massage table system.

As is shown in this example, in some embodiments, a robotic arm (e.g., 202) is included in an automated massage table system (e.g., 200); the automated massage table system further includes a plurality of sensors (e.g., 212) directed towards a table (e.g., 214) in the automated massage table system and that output sensor information; and the body model is based at least in part on the sensor information.

The following figure illustrates an example block diagram of modules and/or components in the automated massage table (200), including various processors and/or controllers.

Figure 3:
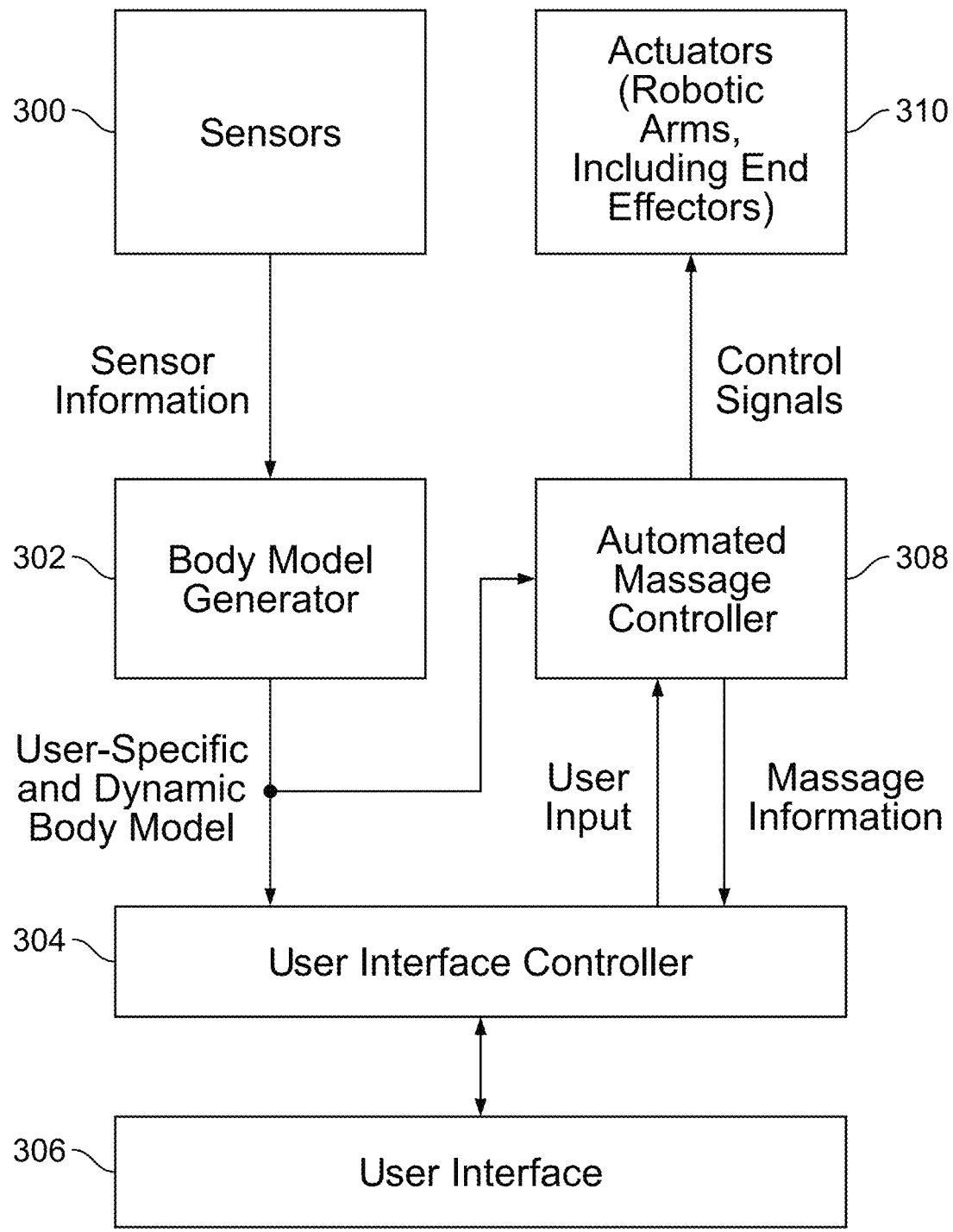
FIG. 3 is a diagram illustrating a block diagram of an automated massage table, including a body model generator, a user interface controller, and an automated massage controller.

FIG. 3 is a diagram illustrating a block diagram of an automated massage table, including a body model generator, a user interface controller, and an automated massage controller. FIG. 3 continues the example of FIG. 2. In this example, there are three processors and/or controllers which are (e.g., independently) responsible for different aspects of decision making and/or management of the automated massage table: the body model generator (302), the user interface controller (304), and the automated massage controller (308).

The body model generator (302) is responsible for generating a body model using the sensor information from the sensors (300). As shown in FIG. 2 and described above, the sensors (300), in this example at least, comprise four depth-sensing and/or IR cameras (see 212 in FIG. 2). The body models that are generated in this example by the body model generator (302) are user-specific (e.g., reflecting an outline based on the massage recipient's body shape and size, an actual image of the massage recipient, etc.) and dynamic (e.g., reflecting movement by the massage recipient if they were to adjust their position on the automated massage table) and as such new and/or updated sensor information may continuously or periodically be passed from the sensors (300) to the body model generator (302). Any appropriate body model generation techniques may be employed by the body model generator (302).

In some embodiments, the body model generator (302) includes a timestamp or other (e.g., accuracy-related) metadata with the body model, and this metadata is stored with that particular body model. For example, in the case of dynamic body models (e.g., where the body model is updated in real-time and/or during the course of the automated massage), the metadata may comprise accuracy metric(s) that are used to select which body model to present to the user based on those accuracy metrics (e.g., how well does a given body model match the current state or dimensions of the user), the state of the massage (e.g., the body part being massaged), and/or any active interactions by the user (e.g., the user moves around on a massage table where the body model is a dynamic body model that is updated in real time and the user's movement triggers an updated body model since the old one is no longer accurate).

In some cases, it may be undesirable to permit a user interaction to initiate or cause an update to the body model visualized or otherwise presented. For example, once a user clicks on (i.e., interacts with) a body model to leverage it as a control surface, any update to the position of joints and muscles can cause frustration, particularly if the automated massage system is designed to update massage trajectories automatically and/or in real time while the user is trying to move around on a (for example) massage table. In some embodiments, the automated massage system reminds a user (e.g., via the user interface) to not move during such portions of the automate massage and/or pauses movement of the robotic arm(s) if a user moves around too much while an automated massage is being provided.

The second controller and/or processor in this example is the user interface controller (304). Generally speaking, the user interface controller (304) is responsible for determining or otherwise generating the display (e.g., including the body model and control object) that is presented in the user interface (306). The user interface controller (304) is also responsible for collecting, assembling, and/or generating the user input based on a user's interactions with the user interface (306), such as a control object that is presented or otherwise displayed in the user interface (306). Returning briefly to FIG. 2, the tablet (210) and touchscreen (208) in the armrest (206) are two examples of the user interface (306).

The third controller and/or processor in this example (i.e., the automated massage controller (308)) is responsible for generating and updating the automated massage, as or if needed. This includes generating control signals and passing those control signals to the actuators (310) of the robotic arms (e.g., including any end effectors). For example, the control signals position and/or control the positions of the robotic arms, how much pressure the robotic arms apply, any vibrations provided by the robotic arms, and so on. In this example, an initial automated massage is determined based on the user-specific and dynamic body model. For example, depending upon the size and/or shape of the massage recipient, the robotic arms may move a shorter distance longitudinally (e.g., from head to toe) for short users, laterally (e.g., side to side) for narrower users, and/or vertically (e.g., up and down) for users with smaller or more slender chests and stomach areas. This initial massage information is passed from the automated massage controller (308) to the user interface controller (304) so that if the user interface (306) is in a mode or state that displays massage information (e.g., a trajectory), then that information is available. In some embodiments, user input is also used by the automated massage controller (308) to generate the initial automated massage (e.g., so that the user can pick a body part or areas to focus on, so that the user can select from a presented list of therapy options, etc.).

In response to user input from the user interface controller (304), the automated massage controller (308) generates an updated automated massage, and updated massage information is passed from the automated massage controller (308) to the user interface controller (304) so that updated massage information (e.g., a new trajectory) can be presented in the user interface (306), as or if desired. Similarly, the control signals that are passed to the actuators (310) would reflect the user input received at the automated massage controller (308).

As is shown in this example, in some embodiments, the body model includes a user-specific and dynamic body model that is received, at the user interface controller (e.g., 304), from a body model generator (e.g., 302).

As is shown in this example, in some embodiments, the user input is output to an automated massage controller (e.g., 308) and the massage information is received from the automated massage controller.

In various embodiments, a variety of (e.g., hardware and/or software) technologies may be layered to implement some of the components shown in FIG. 3 (e.g., to represent the body model and/or display the body model and other objects in a user interface). In one example, a game engine, such as Unity, is used. In some applications, using Unity or a similar game engine is attractive because it is well suited for displaying and interacting with 3D models. However, in at least some applications, using a game engine, such as Unity, is undesirable because of performance limitations, underlying platform limitations, incompatibility with other libraries, and limited support for broader front-end components. Naturally, depending upon the design considerations for a given application, a game engine-based implementation may be acceptable (or not).

In some embodiments, the Android mobile operating system is used (e.g., to represent the body model and/or display the body model and other objects in a user interface). An example is described in more detail below where Filament (a real-time and physically based rendering engine) is used in combination with the Android mobile operating system. As will be described in more detail below, physics-based rendering is desirable in at least some applications because it produces more sophisticated, attractive, and/or natural-looking objects in a display (e.g., less "plastic-y") and Filament (or a similar real-time and physically based rendering engine) provides many useful physics-based rendering tools and/or capabilities to quickly implement the techniques and/or systems described herein.

It is noted that the (e.g., user interface) techniques and/or systems that are described herein are agnostic to (as an example) the implementation of the sensors (300), body model generator (302), the automated massage controller (308), and/or the actuators (310). Conceptually, those (e.g., peripheral) modules that are not directly related to the (e.g., user interface) techniques and/or systems described herein may be thought of as a black box.

It may be helpful to illustrate some examples of displays (e.g., presented in a user interface) that include various combinations and types of body models and control objects. The following figures illustrate some such examples.

Figure 4:
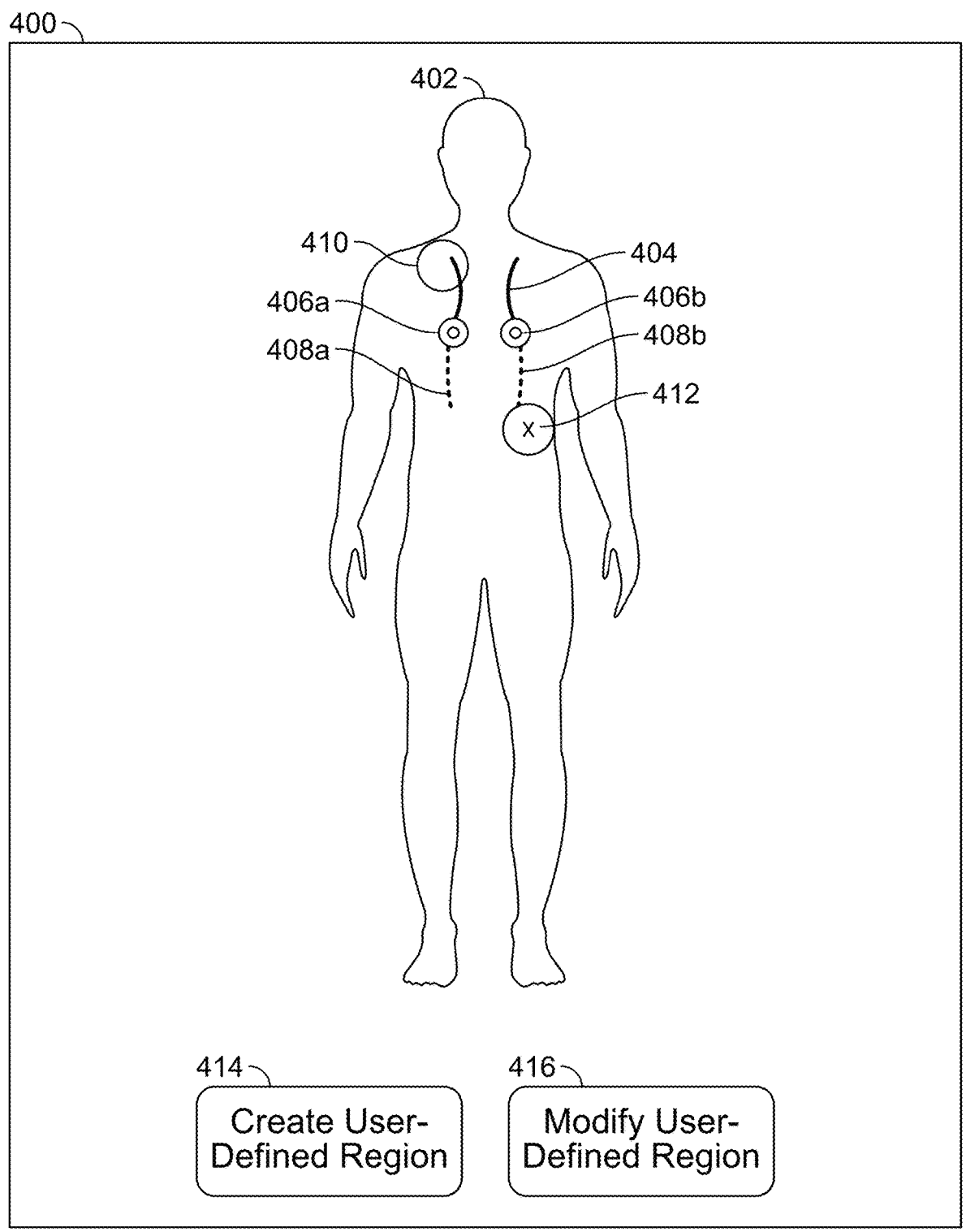
FIG. 4 is a diagram illustrating an embodiment of a display with user-defined regions.

FIG. 4 is a diagram illustrating an embodiment of a display with user-defined regions. In this diagram, the exemplary display (400) includes a body model (402) that is an outline-only, full-body body model. The display (400) also includes information associated with the automated massage, including past massage information in the form of stroke histories (404), current massage information in the form of (e.g., current) touchpoint indicators (406a and 406b), and future or projected massage information in the form of projected paths (408a and 408b), also referred to as trajectories. In this example, to differentiate or otherwise distinguish between the different types of massage information, the stroke histories (404) are indicated using unbroken and curved lines, the touchpoint indicators (406a and 406b) are indicated using two concentric circles, and the trajectories (408a and 408b) are indicated using dotted and curved lines.

Returning briefly to the example of FIG. 2, the stroke histories (404) correspond to where the two end effector parts (204) of the robotic arms (202) previously came into contact with the massage recipient, the touchpoint indicators (406a and 406b) correspond to where the two end effectors (204) are currently in contact with the massage recipient, and the trajectories (408a and 408b) correspond to where the two end effector parts (204) of the robotic arms (202) will (e.g., in the future) come into contact with the massage recipient.

In this example, the display (400) includes two buttons (414 and 416) to create and modify user-defined regions, respectively. In some embodiments, the modify button (416) brings up a variety of menus, interfaces, and/or control objects which permit not only the shape and/or size of a (e.g., selected) user-defined region to be modified, but also allow a (e.g., selected) user-defined region to be associated with a variety of properties, rules, and/or limits (e.g., radio buttons to specify whether the region should be focused on vs. avoided; specifying associated minimum or maximum (e.g., pressure) values, and so on).

In this example, the display (400) includes user-defined regions (410 and 412) that were created using the create button (414) and modified (as or if desired) using the modify button (416). In various embodiments, a user-defined region may be associated with various rules, limits (e.g., minimums, maximums, etc.), and/or therapy-related purposes. In this example, the user-defined region at left (410) is associated with an area to focus on (i.e., a focus area) during the automated massage whereas the user-defined region at right (412) is associated with an area to avoid during the automated massage (i.e., an avoidance area or a "no go" zone). A focus area (410) may prompt a variety of displays in a user interface and/or may be used by an automated massage (e.g., table) system in a variety of ways. In one example, after a focus area (410) is defined or otherwise created, the display (400) is updated to present (e.g., automated) massage therapy sequences or routines that target the focus area (410). In another example, in response to a focus area (410) being defined or otherwise created, an automated massage is adjusted so that the amount of pressure and/or amount of time spent in the focus area (410) increases.

The user-defined region at right (412) is associated with an area to avoid. As with a focus area (410), an area to avoid (412) may prompt a variety of displays in a user interface and/or may be used by an automated massage (e.g., table) system in a variety of ways.

In one example scenario, as part of the onboarding process (e.g., when a new user is creating an account and/or providing their information and/or preferences), a user interface asks (e.g., via a graphical user interface, a text-based interface, etc.) users if there are any specific areas on their body they would like the automated massage system to focus on or areas that they would like to avoid. In some cases, a user-defined region is episodic (e.g., only for that episode and/or session) and/or temporary. For example, a user may have a cast on their arm or a broken leg. In some other cases, a user-defined region is (more) permanent and/or lasting.

Although the user-defined regions (410 and 412) are shown here as circles, other shapes may be used to define the boundaries of the user-defined regions in other embodiments. For example, the user may be able to define a freeform or polygonal region or shape. In some embodiments, different shading techniques, styles, etc. are used to (e.g., subtly) highlight and differentiate between regions. Similarly, although the area to focus on (410) and the area to avoid (412) are distinguished by no "X" mark and an "X" mark, respectively, different indicators may be used.

Returning briefly to FIG. 1, the buttons (414 and 416) and user-defined regions (410 and 412) are examples of control objects that are presented or otherwise displayed (e.g., at 102 in FIG. 1) and via which user input is received (e.g., at 104 in FIG. 1).

In some embodiments, the opportunity to create user-defined regions is presented at the beginning of a massage therapy session and any user-defined regions (e.g., creating during that session or saved from a previous session) may be used by an automated massage controller (e.g., 308 in FIG. 3) to generate an automated massage. For example, the automated massage controller may eliminate any therapy that would fall within a user-defined area to avoid (412) and/or increase the (e.g., time) duration and/or (e.g., pressure) intensity of therapy that falls within a user-defined focus area (410).

In some embodiments, user-defined regions (e.g., 410 and 412) are stored or otherwise represented within an automated massage system (e.g., within a user interface controller) in a manner that is convenient for and/or amenable to shifting or movement by the massage recipient. For example, the massage recipient may roll over between prone position and supine position, may spread their legs slightly, etc. This body movement may cause a corresponding change in the body model (at least for those embodiments where the body model is dynamic and is updated periodically or continuously) and the user-defined regions may also need to be shifted or otherwise transformed.

In some embodiments, the display (400) presents an updated (e.g., shifted) body model (e.g., corresponding to 402) and an updated (e.g., transformed or stretched) user-defined area to avoid (e.g., corresponding to 412) to indicate or otherwise convey to the massage recipient that the user-defined area to avoid (412) is still respected, even if or when the massage recipient moves or shifts. In contrast, other systems that do not display (e.g., updated) body models in combination with (e.g., updated) control objects are not able to reassure users in this manner, potentially leading to user anxiety and an unnecessary early termination of the automated massage.

The following figure illustrates an example of a control object that may be used to modify one of the trajectories (408a and 408b) shown here.

Figure 5:
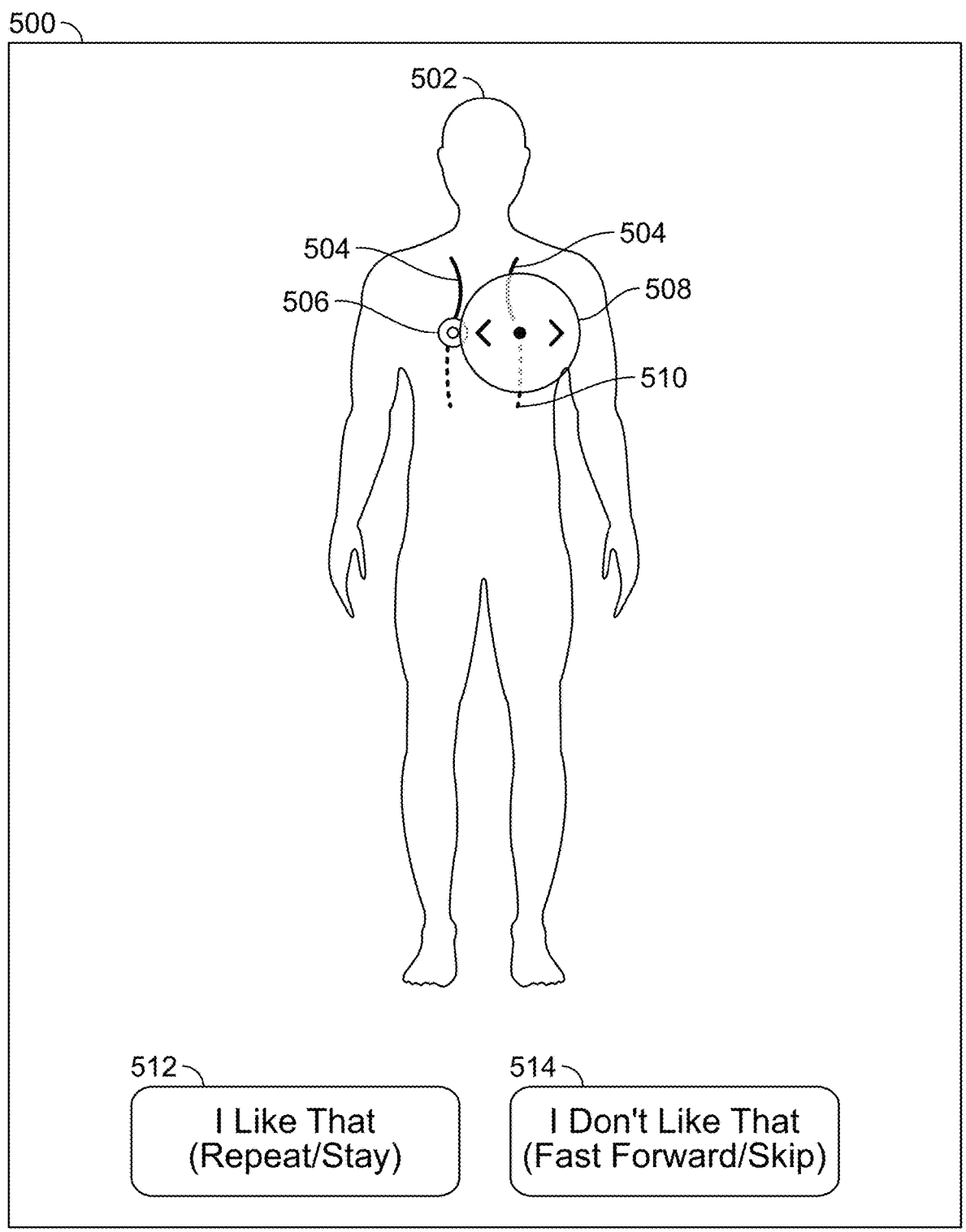
FIG. 5 is a diagram illustrating an embodiment of a display with a path nudge control.

FIG. 5 is a diagram illustrating an embodiment of a display with a path nudge control. In this example, the display (500) includes a body model (502) with left and right stroke histories (504). A left touchpoint indicator (506) is shown but instead of a right touchpoint indicator, a path nudge control (508) is shown with a left-and-right control to nudge the right robotic arm (not shown) either to the left or right. In this example, the two robotic arms are independent, so using the (e.g., right) path nudge control (508) will not affect the left robotic arm (not shown). The size of the path nudge control (508), at right, is larger than the touchpoint indicator (506), at left, so that it is easier for a user to interact with the path nudge control (508).

To put the example of FIG. 5 in context with the example of FIG. 1, the path nudge control (e.g., 508 in FIG. 5) is one example of a control object that is presented or otherwise displayed (e.g., at step 102 in FIG. 1) and via which user input is received (e.g., at step 104 in FIG. 1).

To put the example of FIG. 5 in context with the example of FIG. 4, the user may have selected (e.g., by double tapping or double clicking) the right touchpoint indicator (406b), triggering or prompting display of the path nudge control (508) shown in FIG. 5. It is noted that a path nudge control (e.g., 508 in FIG. 5) enables a user to avoid certain areas or body parts without having to create a user-defined area to avoid (e.g., 412 in FIG. 4) and some users may find a path nudge control (e.g., 508 in FIG. 5) easier, faster, and/or more intuitive. Conversely, if a robotic arm is not quite hitting a spot where a user would like the robotic arm to be, a path nudge control can be used to move a robotic arm to a more desirable position.

In some embodiments, a single "click" (e.g., left or right) of the path nudge control (508) produces a displacement of the robotic arm that is dependent upon the (e.g., representative) body model and/or dimensions of the user. For example, if a smaller user clicks the path nudge control (508) once, the robotic arm displacement would be less than if a larger user clicked the path nudge control (508) once. For example, this may balance the needs of differently sized people so that smaller users do not feel the controls are too coarse (e.g., a single click of the path nudge control (508) causes too much of a jump or shift in the robotic arm, overshooting a desired position) and larger users do not feel the controls are too fine (e.g., a single click of the path nudge control (508) causes too little of a jump or shift in the robotic arm, and it takes too long to move the robotic arm to a desired position).

In some embodiments, a user interaction with the path nudge control (508) does not affect (e.g., in the long run) the right-side trajectory (510). In other words, the path nudge control (508) produces a temporary deviation from the right-side trajectory (510), but eventually the robotic arm will eventually return to the right-side trajectory (510). Alternatively, in some embodiments, a user interaction with the path nudge control (508) does cause a change to the trajectory (510). The option that is performed may be communicated to a user by either illustrating a "detour" to the trajectory (510) in a display (for the first option), or by displaying a shifted and/or new trajectory (510) (for the second option) so that the user knows whether the shift is temporary or more permanent. In some embodiments, both options are available to the user and the user can interact with the user interface to specify if they prefer temporary displacement of the robotic arm, or a more long-lasting change to the trajectory.

In addition to the path nudge control (508), the exemplary display (500) includes two control buttons (512 and 514). The left button (512) says "I Like That" and (in this example at least) is used to keep both the right and left robotic arms in their current position and/or repeating a current movement or motion. For example, a user may have a "knot" (sometimes referred to herein as a trigger point) in their muscle where one or both of the robotic arms is/are touching the user, and the user would like the robotic arm(s) to stay in their current position and/or keep repeating the current movement or motion.

The right button (514) says "I Don't Like That" and is used in this example to pause, stop, or "fast forward" through the massage treatment currently being provided by the right and left robotic arms. In various embodiments, pressing the "I Don't Like That" button (514) may cause an automatic massage (table) system to retract the robotic arms (e.g., so that the robotic arms are no longer touching the massage recipient), or cause an automatic massage controller to skip to a next portion of an automatic massage that is directed to another body part (e.g., causing the robotic arms to move to the next body part). For example, the robotic arms may be currently touching a sore, sensitive, and/or ticklish spot on the massage recipient's body.

Although the examples of FIGS. 4 and 5 showed touchpoint indicators (406a and 406b in FIG. 4 and 506 in FIG. 5) with concentric circles, in some other embodiments, some other type of representation is used. The following figure shows one such example where the touchpoint indicator has a color gradient representing a degree or amount of pressure.

Figure 6:
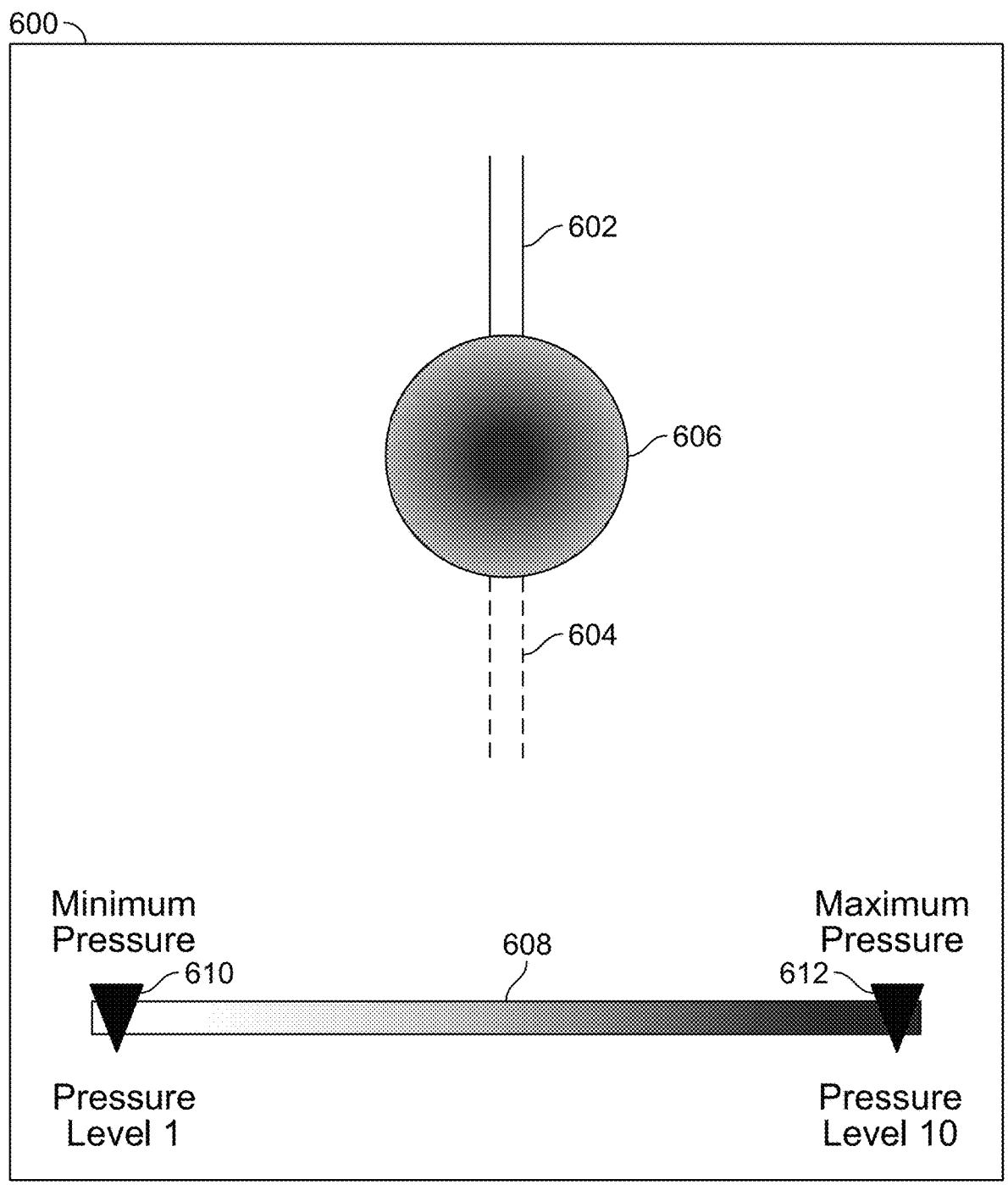
FIG. 6 is a diagram illustrating an embodiment of a display that includes a touchpoint indicator with a color gradient and a slider bar to control pressure.

FIG. 6 is a diagram illustrating an embodiment of a display that includes a touchpoint indicator with a color gradient and a slider bar to control pressure. In this example, the display (600) includes a stroke history (602), a trajectory (604), a touchpoint indicator (606), and a color gradient bar (608) with slider controls (610 and 612).

In this example, the touchpoint indicator (606) is in the shape of a circle with a color gradient: darker at the center and lighter at the periphery. The color gradient bar (608) illustrates the colors that correspond to the varying degrees or amounts of pressure where the darker end of the color gradient corresponds to a heavier pressure (see, e.g., right end of color gradient bar (608)) and the lighter end of the color gradient corresponds to a lighter pressure (see, e.g., left end of color gradient bar (608)).

In this example, the color gradient bar (608) has two controllers or sliders (610 and 612) superimposed over the color gradient bar (608) that are used to control minimum pressure (610) and maximum pressure (612). In the state shown here, the minimum pressure slider (610) is at "Pressure Level 1" and the maximum pressure slider (612) is at "Pressure Level 10." In some embodiments, the sliders (610 and 612) set the minimum pressure and maximum pressure, respectively, for a specific and/or selected body part or user-defined region. In some other embodiments, the sliders (610 and 612) set the minimum pressure and maximum pressure globally. Similarly, the duration of the specified pressure limits may be for that massage session only, or may be stored for future massage sessions.

Naturally, the degree or amount of pressure or intensity that is applied by the robotic arm(s) can be (e.g., visually) conveyed in a variety of ways. In some embodiments, a line thickness (e.g., of the outline) or size of the touchpoint indicator (e.g., a larger size corresponds to a greater amount of pressure or intensity) is used to communicate intensity or pressure.

In this example, the circular shape and color gradient of the touchpoint indicator (606) correspond to the shape of the end effectors (204) shown in FIG. 2 (e.g., conical with a rounded tip). In some embodiments, the end effectors have some other (e.g., 3D) shape and the (e.g., 2D) shape of the (displayed) touchpoint indicator (606) reflects the shape of the end effector. The following figure shows an example of this.

Figure 7:
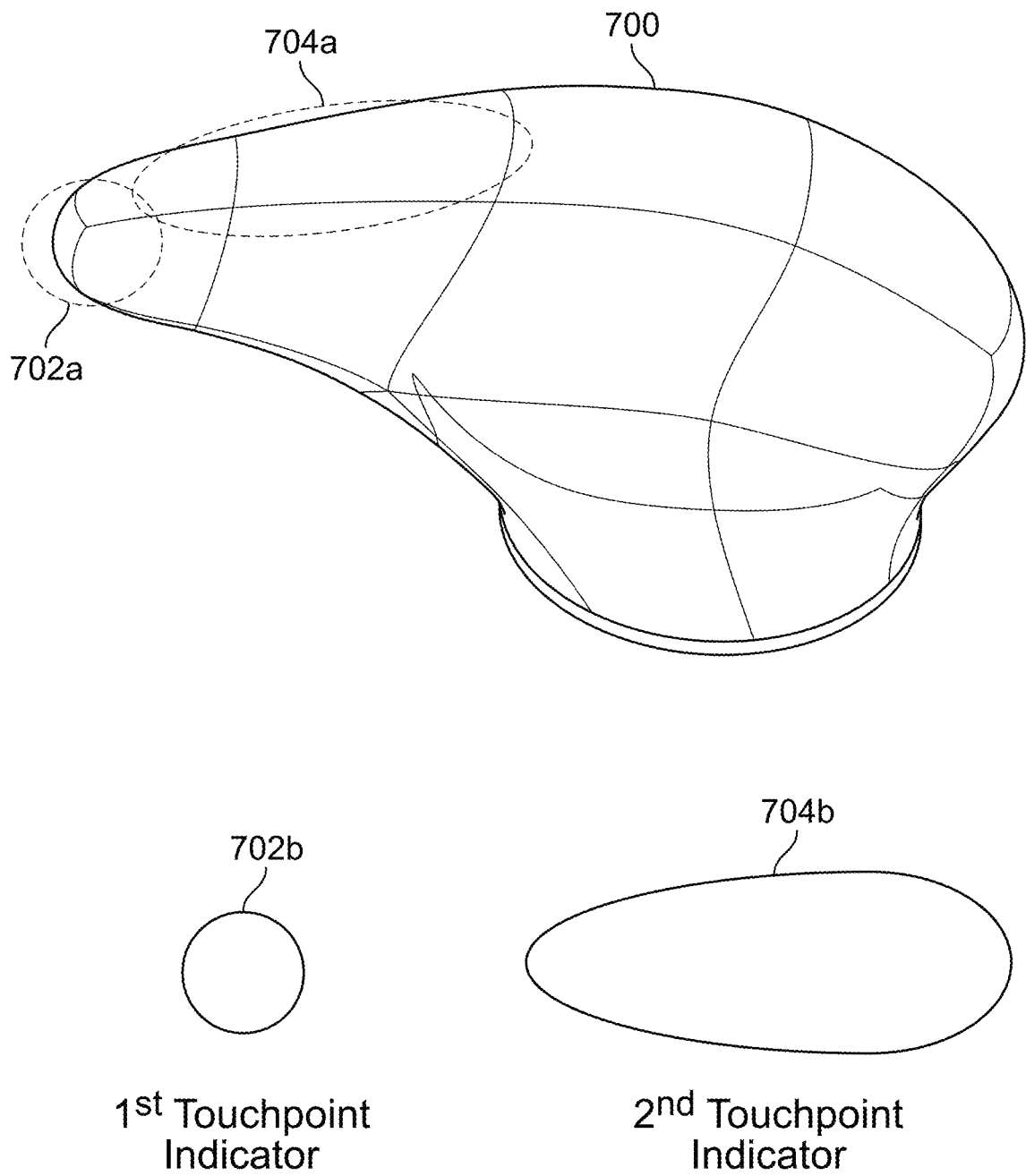
FIG. 7 is a diagram illustrating an embodiment of an end effector with multiple touch surfaces.

FIG. 7 is a diagram illustrating an embodiment of an end effector with multiple touch surfaces. In this example, the end effector (700) has a smooth surface with asymmetric protrusions. The exemplary end effector (700) can be manipulated into a select position and/or orientation so that a selected one of the multiple touch surfaces (702a and 704a) is in contact with the massage recipient (e.g., including by rotating and/or extending an attached or otherwise coupled robotic arm, as needed). Having multiple or different touch surfaces (e.g., 702a and 704a) permits an automated massage table to provide different experiences and/or types of therapy. For example, the distal-end touch surface (702a) is at the protruding, distal end of the end effector (700) and may be used to simulate and/or approximate a massage therapist's thumb and the top touch surface (704a) with a width greater than its height may be used to simulate and/or approximate the side of a massage therapist's palm.

At the bottom, two (e.g., 2D) touchpoint indicators (702b and 704b) are shown with shapes that correspond to the exemplary (e.g., 3D) touch surfaces (702a and 704a), respectively. In this example, the first touchpoint indicator (702b) is circular whereas the second touchpoint indicator (704b) is an oval with a horizontal axis of symmetry (e.g., roughly egg-shaped). Some other systems do not necessarily have end effectors that can rotate with multiple touch surfaces, nor do some other systems have representative shapes for a touchpoint indicator that illustrates a representative and/or corresponding area of contact for a given touch surface. This, for example, may better inform a user about an automated massage (e.g., which touch surface is currently being used) which in turn may enable a user to better control or manage an automated massage (e.g., enabling the user to switch to a preferred and/or more comfortable touch surface, or increase (decrease) the area of the touch surface by lowering (raising) the robotic arm).

As is shown in this example, in some embodiments, a robotic arm includes a rotatable end effector (e.g., 700) with a plurality of touch surfaces (e.g., 702a and 704a), including a selected touch surface; and the massage information includes a touchpoint indicator having a shape (e.g., 702b or 704b), wherein the shape of the touchpoint indicator corresponds to the selected touch surface.

As described above, in some embodiments, a body model is a real-time body model. In some embodiments, in the event a (e.g., relatively) large change in the real-time body model is detected (e.g., corresponding to and/or consistent with a user sitting up or getting off an automated massage table), the automated massage pauses or halts. The following figures show an example of a display that may be presented to a user in response to detecting such a large-scale movement.

Figure 8:
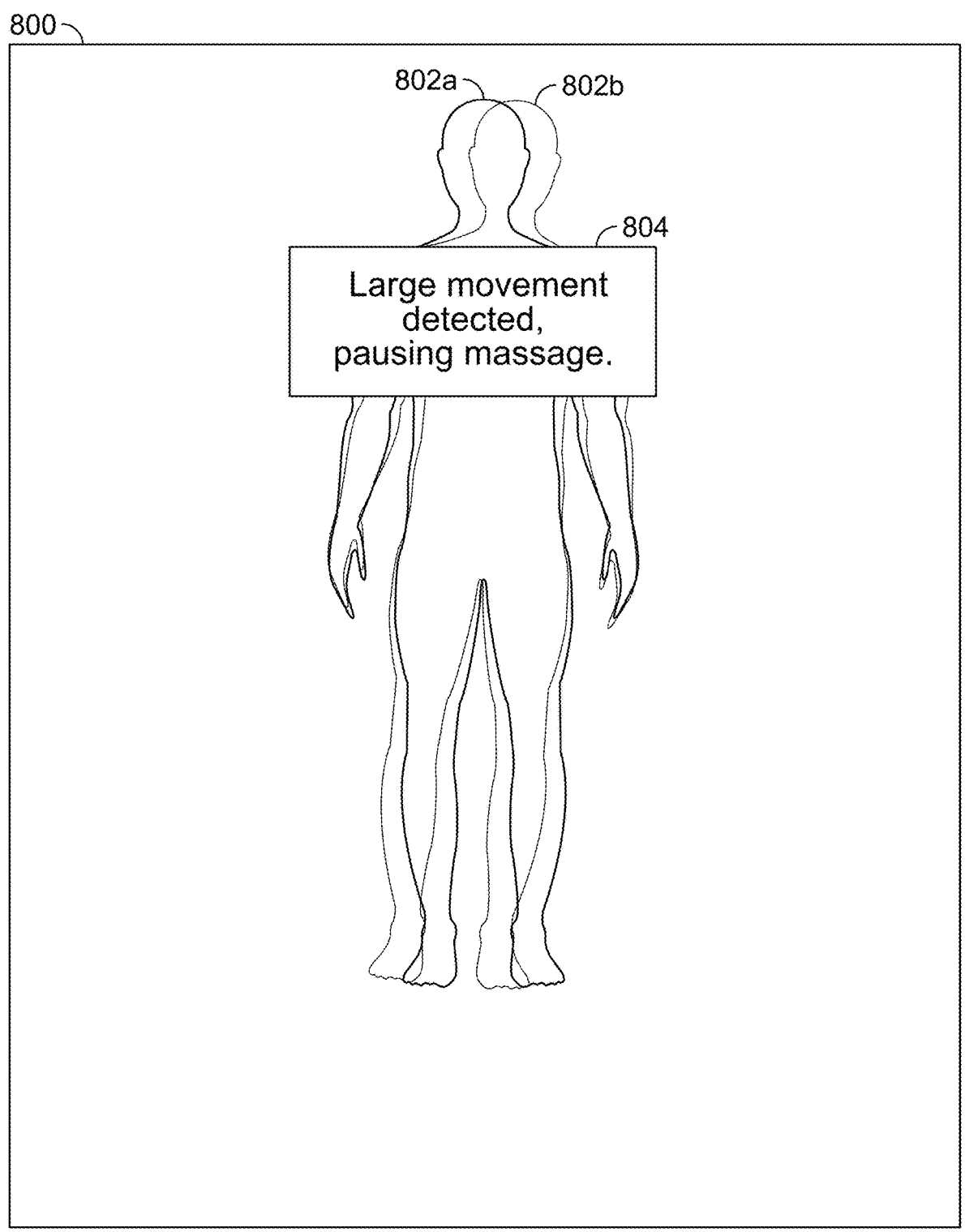
FIG. 8 is a diagram illustrating an embodiment of a display indicating that an automated massage has paused in response to detecting a large movement.

FIG. 8 is a diagram illustrating an embodiment of a display indicating that an automated massage has paused in response to detecting a large movement. In this example, display 800 includes a body model (802a) and a shadow outline (802b). The shadow outline (802b) in this example has the same outline as the body model (802a), but the shadow outline (802b) is displayed using a lighter line color and is slightly offset and rotated relative to the body model (802a). In this example, the presence of the shadow outline (802b) is used to convey or otherwise indicate that a large movement or motion (e.g., corresponding to and/or consistent with a user sitting up or getting off an automated massage table) has been detected. For example, the shadow outline (802b) is not necessarily displayed when (relatively) small motion or movement is detected.

In response to detecting a large movement, the automated massage (table) system pauses or otherwise halts the automated massage. This is communicated to the user with the displayed message (804), "Large movement detected, pausing massage." In some embodiments, the robotic arms (also) move away from the user, so that the user can more easily get up and/or off an automated massage table if so desired.

Returning briefly to FIG. 3, in some embodiments, the body model generator (302) is responsible for detecting if a large movement has occurred. For example, the body model generator (302) may output a "large movement" signal that is asserted either TRUE or FALSE. This signal may be output to the user interface controller (304) and/or the automated massage controller (308) to signal that the automated massage should be paused or otherwise halted and such information should be communicated to a user via a user interface.

In various embodiments, an automated massage system and/or its user interface may have a variety of transitions and/or "next steps" from the state shown in diagram 800. For example, diagram 800 may (e.g., subsequently) display a pop-up window saying, "Do you wish to quit?" with a Yes button and a No button. In some embodiments, if the automated massage system detects that the large movement has stopped and/or a user has returned to a lying-down position, diagram 800 may display a pop-up window saying, "Would you like to resume the massage?" with a Yes button and a No button.

As is described in this example, in some embodiments, an indication associated with satisfying a movement detection criterion is received; and in response to receiving the indication, the user interface controller instructs the user interface to display a massage interruption notification, wherein the massage information includes the massage interruption notification.

In the above examples, the body models are 2D, outline-only body models. The following figures illustrate an example of a 3D body model with interior details.

FIG. 9A is a diagram illustrating an embodiment of a 3D body model with interior details showing muscles. In this example, the body model (900) is in a prone position, with arms extended forward. Using the automated massage table (200) shown in FIG. 2 as an example, the user may be lying in a prone position with their forearms and hands resting on the armrest (206). In this example, the body model (900) includes a variety of interior (e.g., muscular) details, including superior fibers of the trapezius muscle (902), middle fibers of the trapezius muscle (904), inferior fibers of the trapezius muscle (906), the deltoid muscle (908), latissimus dorsi (910), gluteus medius (912), and gluteus maximus (914).

In some embodiments, a user can select one of the displayed muscles (904-914) to manage or specify massage-related settings or information for the selected muscle(s). For example, a user may begin an automated massage session by selecting one or more muscle(s) and instructing the automated massage system to work on or otherwise provide massage therapy (e.g., only) to the selected muscle(s). In another example, selected muscle(s) can be designated as "off-limits" by the user. In some embodiments, a user can specify a limit associated with an amount of pressure or intensity for selected muscle(s).

The 3D body model shown here (800) is merely exemplary and is not intended to be limiting. For example, as described above, other interior details which may be presented or otherwise displayed in a body model include tendons, bones, organs, etc. In some embodiments, applications, or scenarios, some different combinations of details or muscles are displayed. For example, depending upon user preference or settings, different muscles may be displayed or hidden. Or, depending upon the massage mode or current massage focus (e.g., providing therapy to legs vs. back), different muscles may be displayed or hidden.

In some cases, a body model communicates information about a universally-restricted region or part of a user's body. The following figure shows one such example.

FIG. 9B is a diagram illustrating an embodiment of a body model with a universally-restricted region. In this example, the body model (950) is of a user's face. For example, the user may be lying on an automated massage table (e.g., 200 in FIG. 2) in a supine position (i.e., in a face-up position) and the body model (950) reflects this position. In this example, there are some parts of the body that the robotic arms(s) of an automated massage system will not touch. This restriction applies in this example to all users of the automated massage system and is therefore referred to as a universally-restricted region.

For example, it would be dangerous for a robotic arm to massage a user's eye and so universally-restricted region (954) which covers the eyes (952) is used to visually communicate the area that is off limits to the robotic arm(s). Other examples of universally-restricted regions include armpits, genitals, etc. In various embodiments, universally-restricted region (954) may be indicated or communicated using a variety of visual techniques, such as color (e.g., greyed out), hatch marks, lighter color intensity, etc. Some other examples of universally-restricted regions include the groin and/or pubic area, armpits, and so on.

In addition to displaying a universally-restricted region (e.g., 954), for example, by using different display elements or features to differentiate between a universally-restricted region (e.g., 954) and accessible regions (e.g., everything in the face (950) other than the universally-restricted region (954)), a user interface may disable or hide control objects or user interactions which would cause intrusion in to a universally-restricted region (e.g., 954). For example, if a path nudge control (not shown) were positioned on the right edge of the universally-restricted region (954), then the left arrow in the path nudge control (not shown) may be grayed out or otherwise disabled. In contrast, the right arrow would be enabled and not grayed out, since movement in that direction (i.e., away from the universally-restricted region) would be permitted.

As with other objects and/or elements in the user interface, the shape and/or size of a universally-restricted region will vary based on a massage recipient's specific size and/or features (at least in some embodiments). For example, a universally-restricted region associated with an eye region may have a perimeter that is based on identifiable bones or other features on a user's face (e.g., the eyebrow bone, cheekbone, etc.) and depending upon the size and/or contours of the user's face, the specific size and/or shape of a universally-restricted region associated with an eye region may vary from user to user. For example, the depth-sensing and/or infrared (IR) cameras (212) in FIG. 2 may be used to detect such facial bones or other features.

The following figure illustrates a portion of the 3D body model (900) shown in FIG. 9A included in a display with additional user interface objects.

FIG. 10 is a diagram illustrating an embodiment of a display with a 3D body model with muscles. In this example, the display (1000) includes a 3D body model (1002), at center, with shoulder and/or back muscles shown.

In the upper left corner of the display (1000) is an audio control object (1004) that says, "Playing" and "Sounds of Nature."

In the upper right corner of the display (1000) is a filter and/or settings control object (1006) with two circular sliders disposed on two lines.

At the right side of the display (1000) is an intensity control object (1008) with a plus (+) button (1010a), a minus (−) button (1010b), and a filled-in portion (1012) indicating a current intensity level.

In the lower right corner of the display (1000) is an immerse feature and/or control object (1014) with an icon of a person in lotus position. In this example, this feature (1014) recesses significant UI components and activates a section in the interface from which a user can select different visualizations during their session. In addition, this control object (1014) may include a (e.g., merchandized) content area that allows them to choose from various types of content (e.g., including, but not limited to, synchronized audio and/or video to playback during a user's session).

At the center and bottom of the display (1000) is a focus feature and/or control object (1016) with an icon of a circle surrounded by four corners. In this example, this feature (1016) is used to quickly allow a user to specify that they would like the automated massage system to spend more time on a currently treated area. In some embodiments, this feature (1016) has a default (e.g., setting) to default to a predetermined duration or manually determined duration.

In the lower left corner of the display (1000) is a massage session object (1018) that says, "Left Side Trigger Points," "De-stress," and "28 min left." For example, a user may have specified the locations of trigger points (1024) and also annotated or labeled those locations as trigger points. The massage session object (1018) also includes a pause/play button (1020) showing two parallel and vertical lines and a growing circumference tracer (1022) that starts at a 12 o'clock position and traces the circumference of the pause/play button (1020) to indicate elapsed time.

In this example, some of the objects in the display (1000) are not only displayed as 3D objects, they are also represented and stored within the system as 3D objects (e.g., the 3D body model (1002)). In contrast, other objects are (e.g., stored, represented, and/or displayed as) 2D objects (e.g., audio control object (1004), filter and/or settings control object (1006), and so on).

In one example usage scenario, to get to the state of the display (1000) shown here (e.g., where the system is in the middle of a massage session directed to a user's left side trigger points), the system begins with the robotic arms quiescent and/or idle. The user then touches a point on the body model (e.g., 1002) corresponding to a muscle or region on the left side of their back. The user then annotates or otherwise labels the specified location (e.g., point) as being a knot (i.e., a trigger point). For example, the user interface may display multiple options and/or text descriptions, and then the user selects the one corresponding to "I have a knot here." After specifying any additional knots, the user (at least in this example scenario) instructs the automated massage system (e.g., via the user interface) to provide massage therapy to the specified trigger points (1024) using the robotic arm(s). In response, the system begins the automated massage program that is directed to the left side trigger points (1024).

In some embodiments, user-specified points or regions (e.g., 2D areas or 3D spaces) and any associated annotations or labels (e.g., knot, area to avoid, area to focus on, etc.) are saved by the system (e.g., for at least the duration of the session, or until deleted by a user) and adjusted during the session, if desired by a user. These user-specified points or regions and annotations may be displayed or otherwise presented to a user in various modes or displays, and any changes to the user-specified points or regions and/or annotations may cause a corresponding change to an automated massage.

As described above, a variety of technologies, libraries, platforms, and/or operating systems may be used to implement the user interface systems and/or techniques described herein. The following figure describes one example where a physically based rendering (PBR) engine is used in combination with a mobile operating system.

Figure 11:
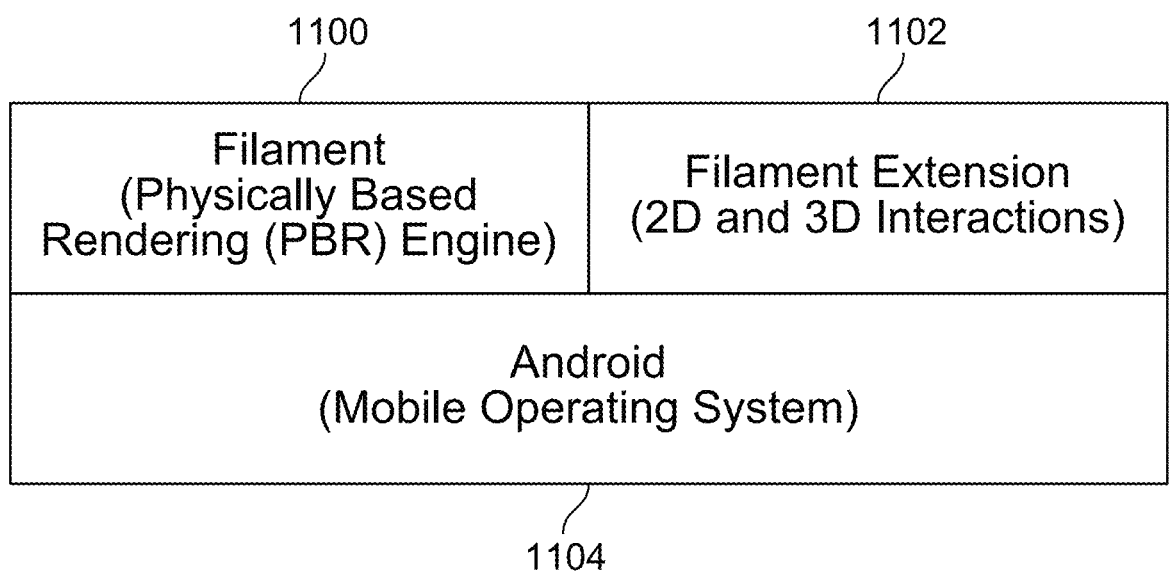
FIG. 11 is a diagram illustrating an embodiment of a user interface implementation that includes a physically based rendering (PBR) engine and a mobile operating system.

FIG. 11 is a diagram illustrating an embodiment of a user interface implementation that includes a physically based rendering (PBR) engine and a mobile operating system. In this exemplary user interface implementation, Android (1104), a mobile operating system, is used as the operating system. In at least some applications, Android (or a similar mobile operating system having similar properties and/or characteristics) is desirable because it offers advantages associated with taking full control of the device, tooling, and/or suitability for mobile applications.

One drawback of using Android to implement a user interface for an automated massage system is that 3D tools and/or services for Android are immature and/or not readily available. Filament (1100), a physically based rendering (PBR) engine, is attractive in at least some embodiments because it already has 3D tools and/or services for Android that may be useful in developing a user interface for an automated massage system. Using Filament (1100), for example, eliminates the need to develop a new Open Graphics Library (OpenGL) renderer.

Another benefit associated with using Filament (1100) is that it is a physically based rendering (PBR) engine. In this example, Filament (1100) is used to render a body model (at least) and other objects in a user interface, as or if desired. An object displayed or otherwise rendered in a user interface by a PBR engine will reflect, incorporate, and/or vary based on physical factors such as light source(s), reflections of light (e.g., off of one or more reflective surfaces before the light hits an objects), shadows, and so on. Using a PBR engine (such as Filament) may produce more attractive and/or natural-looking body models in a user interface compared to non-PBR engines. For example, Filament (1100) may render or otherwise display a body model that has more realistic looking clothing, skin, and/or hair (e.g., with better shadowing, reflections off of shiny fabrics or surfaces, etc.). Certain materials or fabrics (e.g., denim, silk, etc.) may be difficult to render in a realistic and/or appealing way without a PBR engine. In contrast, some other user interfaces for automated massage systems do not use a PBR engine, and are therefore unable to render attractive and/or natural-looking body models and/or other objects in the user interface.

Another benefit to using Filament (1100) is that Filament was developed with the power-constrained limitations of a mobile environment and/or mobile application in mind. To put it another way, an alternative OpenGL rendering engine (i.e., not Filament) may be a PBR engine (like Filament), but that alternative will tend to drain mobile batteries faster than Filament. As is shown in FIG. 2, in some embodiments, a user interface for an automated massage system is implemented on a tablet (210) and so power consumption is an important consideration (in at least some embodiments). Filament (1100) balances or otherwise supports both power considerations (e.g., low power is desirable) and performance (e.g., physically based rendering is desirable).

In this example, an extension (1102) to the Filament PBR engine (1100) is included. The Filament extension (1102) supports interactions between 2D and 3D rendering. For example, a rendered body model is a 3D object, whereas other (user interface) objects in the user interface are 2D. Suppose, for example, a user draws a (e.g., 2D) circle or line going through a 3D body model; that type of interaction does not exist and/or is not supported in Filament. Conceptually, the Filament extension (1102) extends the 3D rendering of Filament (1100) with (e.g., new and/or supplemental) 2D rendering (e.g., in the Filament extension (1102)) and then merges the two frameworks together. To continue the example interaction from above, this merging of 2D and 3D could be implemented as an overlay (e.g., performed by the extension (1102)) of a first layer with a 2D circle (e.g., associated with the extension (1102)) over a second layer of a 3D body model (e.g., associated with Filament (1100)).

As described above, in some embodiments, displaying the body model, the control object, and the massage information (e.g., at 102 in FIG. 1) includes using one or more of the following: Unity or a game engine.

As shown in this example, in some embodiments, displaying the body model, the control object, and the massage information (e.g., at 102 in FIG. 1) includes using one or more of the following: a physically based rendering engine (e.g., 1100) or a mobile operating system (e.g., 1104).

As shown in this example, in some embodiments, displaying the body model, the control object, and the massage information (e.g., at 102 in FIG. 1) includes using Filament (e.g., 1100), Android (e.g., 1104), and a Filament extension associated with 2D and 3D interactions (e.g., 1102).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an armrest;
    a headrest having a cutout;
    a user interface controller, wherein the user interface controller:
        receives a dynamic body model representing a massage recipient of an automated massage that is provided via a robotic arm, wherein:
            there is at least one updated version of the dynamic body model that is updated during the automated massage; and
            the dynamic body model includes clothing worn by the massage recipient during the automated massage;
        receives, via a control object in a user interface, a user input;
        outputs the user input, wherein the user input is used to update the automated massage that is provided via the robotic arm; and includes a physically based rendering engine and uses the physically based rendering engine to generate a rendering that is presented in the user interface, wherein the rendering simultaneously includes: (1) the dynamic body model, including said at least one updated version of the dynamic body model that is updated during the automated massage and including shadowing on the clothing worn by the massage recipient during the automated massage based at least in part on a light source, (2) the control object associated with controlling the automated massage that is provided via the robotic arm, and (3) massage information associated with the automated massage that is provided via the robotic arm, including a touchpoint indicator showing in real time where the robotic arm is touching the massage recipient; and the user interface, wherein:
the user interface presents the rendering generated by the physically based rendering engine;
the user interface is at least partially embedded within the armrest; and
the user interface is at least partially visible through the cutout in the headrest when the massage recipient is in a prone position.

2. The system recited in claim 1, wherein the dynamic body model has one or more of the following properties: two-dimensional, three-dimensional, outline-only, contains one or more interior details, contains one or more exterior details, based at least in part on an image, created based on contact sensing via an automated massage system that includes the robotic arm, includes a timestamp or other accuracy-related metadata, customized based on sensor information, corresponds to an entire body, or corresponds to a subset of the entire body.

3. The system recited in claim 1, wherein the control object includes one or more of the following: a button, a checkbox, a slider, a dial, touch-gesture control object, a draggable element, a selectable region, a text field, is associated with changing a time duration, is associated with changing the touchpoint indicator, is associated with changing an intensity, is associated with managing a user-specified area, is associated with setting a limit on the automated massage, is associated with changing a trajectory, is associated with adjusting massage content, or is associated with a user interacting with the dynamic body model to specify desired massage work.

4. The system recited in claim 1, wherein the massage information includes one or more of the following: a tempo or a speed of the automated massage, a massage action type or a stroke type, a massage application, a stroke or content library, a stroke history, a touchpoint position or touchpoint orientation, a trajectory, an intensity indication, a massage interruption notification in response to satisfaction of a movement detection criterion, or a universally-restricted region.

5. The system recited in claim 1, wherein:
the robotic arm is included in an automated massage table system; and
the robotic arm is movably coupled to the automated massage table system beneath a table in the automated massage table system.

6. The system recited in claim 1, wherein:
the robotic arm is included in an automated massage table system;

the automated massage table system further includes a plurality of sensors directed towards a table in the automated massage table system and that outputs sensor information; and
the dynamic body model is based at least in part on the sensor information.

7. The system recited in claim 1, wherein the dynamic body model is received from a body model generator.

8. The system recited in claim 1, wherein:
an indication associated with satisfying a movement detection criterion is received; and
in response to receiving the indication, the user interface controller instructs the user interface to display a massage interruption notification, wherein the massage information includes the massage interruption notification.

9. The system recited in claim 1, wherein simultaneously displaying the dynamic body model, the control object, and the massage information includes using one or more of the following: a game engine, a mobile operating system, a real-time and physically based rendering engine, or an extension associated with 2D and 3D interactions.

10. A method, comprising:
receiving a dynamic body model representing a massage recipient of an automated massage that is provided via a robotic arm, wherein:
there is at least one updated version of the dynamic body model that is updated during the automated massage; and
the dynamic body model includes clothing worn by the massage recipient during the automated massage;
receiving, via a control object in a user interface, a user input;
outputting the user input, wherein the user input is used to update the automated massage that is provided via the robotic arm;
using a physically based rendering engine, included in a user interface controller, to generate a rendering that is presented in the user interface, wherein the rendering simultaneously includes: (1) the dynamic body model, including said at least one updated version of the dynamic body model that is updated during the automated massage and including shadowing on the clothing worn by the massage recipient during the automated massage based at least in part on a light source, (2) the control object associated with controlling the automated massage that is provided via the robotic arm, and (3) massage information associated with the automated massage that is provided via the robotic arm, including a touchpoint indicator showing in real time where the robotic arm is touching the massage recipient; and
presenting, via the user interface, the rendering generated by the physically based rendering engine, wherein:
the user interface is at least partially embedded within an armrest; and
the user interface is at least partially visible through a cutout in a headrest when a massage recipient is in a prone position.

11. The method recited in claim 10, wherein the dynamic body model has one or more of the following properties: two-dimensional, three-dimensional, outline-only, contains one or more interior details, contains one or more exterior details, based at least in part on an image, created based on contact sensing via an automated massage system that includes the robotic arm, includes a timestamp or other accuracy-related metadata, customized based on sensor information, corresponds to an entire body, or corresponds to a subset of the entire body.

12. The method recited in claim 10, wherein the control object includes one or more of the following: a button, a checkbox, a slider, a dial, touch-gesture control object, a draggable element, a selectable region, a text field, is associated with changing a time duration, is associated with changing the touchpoint indicator, is associated with changing an intensity, is associated with managing a user-specified area, is associated with setting a limit on the automated massage, is associated with changing a trajectory, is associated with adjusting massage content, or is associated with a user interacting with the dynamic body model to specify desired massage work.

13. The method recited in claim 10, wherein the massage information includes one or more of the following: a tempo or a speed of the automated massage, a massage action type or a stroke type, a massage application, a stroke or content library, a stroke history, a touchpoint position or touchpoint orientation, a trajectory, an intensity indication, a massage interruption notification in response to satisfaction of a movement detection criterion, or a universally-restricted region.

14. The method recited in claim 10, wherein:
the robotic arm is included in an automated massage table system;
the automated massage table system further includes a plurality of sensors directed towards a table in the automated massage table system and that outputs sensor information; and
the dynamic body model is based at least in part on the sensor information.

15. The method recited in claim 10, wherein simultaneously displaying the dynamic body model, the control object, and the massage information includes using one or more of the following: a game engine, a mobile operating system, a real-time and physically based rendering engine, or an extension associated with 2D and 3D interactions.

16. The system recited in claim 1, wherein:
the robotic arm includes a rotatable end effector having a plurality of 3D touch surfaces;
in the event the rotatable end effector is in a first position:
the robotic arm touches the massage recipient using a first 3D touch surface from the plurality of 3D touch surfaces; and
the user interface displays the touchpoint indicator with a first 2D shape that is based at least in part on the first 3D touch surface; and
in the event the rotatable end effector is in a second position:
the robotic arm touches the massage recipient using a second 3D touch surface from the plurality of 3D touch surfaces; and
the user interface displays the touchpoint indicator with a second 2D shape that is based at least in part on the second 3D touch surface.

17. The method recited in claim 10, wherein:
the robotic arm includes a rotatable end effector having a plurality of 3D touch surfaces;
in the event the rotatable end effector is in a first position:
the robotic arm touches the massage recipient using a first 3D touch surface from the plurality of 3D touch surfaces; and
the user interface displays the touchpoint indicator with a first 2D shape that is based at least in part on the first 3D touch surface; and
in the event the rotatable end effector is in a second position:
the robotic arm touches the massage recipient using a second 3D touch surface from the plurality of 3D touch surfaces; and
the user interface displays the touchpoint indicator with a second 2D shape that is based at least in part on the second 3D touch surface.

18. The system recited in claim 1, wherein:
the dynamic body model further includes a timestamp associated with when the dynamic body model was generated; and
the timestamp is used to determine if the dynamic body model is still accurate.

19. The method recited in claim 10, wherein:
the dynamic body model further includes a timestamp associated with when the dynamic body model was generated; and
the timestamp is used to determine if the dynamic body model is still accurate.

20. The system recited in claim 1, wherein:
the dynamic body model includes a three-dimensional (3D) and dynamic body model;
the user interface further: receives a two-dimensional (2D) user input that overlaps with the 3D and dynamic body model; and
the user interface controller further:
includes an extension to the physically based rendering engine; and
supports a 2D and 3D interaction between the 3D and dynamic body model and the 2D user input that overlaps with the 3D and dynamic body model, including by: merging together a 2D framework, associated with the extension to the physically based rendering engine, and a 3D framework, associated with the physically based rendering engine.

21. The method recited in claim 10, wherein:
the dynamic body model includes a three-dimensional (3D) and dynamic body model;
the user interface further: receives a two-dimensional (2D) user input that overlaps with the 3D and dynamic body model; and
the user interface controller further:
includes an extension to the physically based rendering engine; and
supports a 2D and 3D interaction between the 3D and dynamic body model and the 2D user input that overlaps with the 3D and dynamic body model, including by: merging together a 2D framework, associated with the extension to the physically based rendering engine, and a 3D framework, associated with the physically based rendering engine.

* * * * *